(12) United States Patent
Birchmeier (10) Patent No.: US 6,351,714 B1
(45) Date of Patent: Feb. 26, 2002

(54) ORDER TRACKING SIGNAL SAMPLING PROCESS

(75) Inventor: John R. Birchmeier, Columbus, OH (US)

(73) Assignee: Entek IRD International Corporation, Milford, OH (US)

( * ) Notice: Subject to any disclaimer, the term of this patent is extended or adjusted under 35 U.S.C. 154(b) by 0 days.

(21) Appl. No.: 09/033,682

(22) Filed: Mar. 3, 1998

(51) Int. Cl.[7] .............................................. G01M 7/00
(52) U.S. Cl. ......................... 702/56; 702/145; 73/570; 73/660
(58) Field of Search ..................... 702/56, 33–36, 702/38, 39, 41–43, 54, 66, 68, 67, 75–77, 86, 96, 103, 106, 113–115, 124–126, 142, 145, 148, 176–178, 182–184, 187, 189, FOR 168, FOR 171, FOR 154, FOR 103, FOR 104, FOR 107, FOR 108, FOR 110, FOR 123, FOR 126, FOR 134, FOR 136, FOR 150, FOR 151; 324/76.19, 76.21, 76.22, 73, 460, 659, 660, 462, 466, 570, 579, 577, 602, 649, 658, 650; 340/683, 679, 680; 700/279, 280, 304; 318/490

(56) References Cited

U.S. PATENT DOCUMENTS

| | | | |
|---|---|---|---|
| 3,307,408 A | 3/1967 | Thomas et al. | 73/462 |
| 3,331,252 A | 7/1967 | Thomas et al. | 73/462 |
| 3,489,013 A | 1/1970 | Taylor et al. | 73/466 |
| 3,501,965 A | 3/1970 | Morrow | 73/462 |
| 3,938,394 A | 2/1976 | Morrow et al. | 73/462 |
| 4,064,704 A | 12/1977 | Blackburn | 73/660 |
| 4,184,205 A | 1/1980 | Morrow | 702/34 |
| 4,322,976 A | 4/1982 | Sisson et al. | 73/659 |
| 4,399,513 A | 8/1983 | Sullivan et al. | 702/182 |
| 4,408,285 A | 10/1983 | Sisson et al. | 702/56 |
| 4,612,620 A | 9/1986 | Davis et al. | 702/184 |
| 5,089,969 A | 2/1992 | Bradshaw et al. | 73/460 |
| 5,412,985 A | * 5/1995 | Garcia et al. | 73/460 |
| 5,511,422 A | * 4/1996 | Hernandez | 73/659 |
| 5,544,073 A | * 8/1996 | Piety et al. | 73/660 |
| 5,633,811 A | 5/1997 | Canada et al. | 702/56 |
| 5,825,657 A | * 10/1998 | Hernandez | 702/182 |
| 5,852,351 A | * 12/1998 | Canada et al. | 318/490 |

OTHER PUBLICATIONS

Vold et al., Multi Axle Order Tracking with the Vold–Kalman Tracking Filter, Sound and Vibration, pp. 30–34, May, 1997.
Product Data, Vold–Kalman Order Tracking Filter–Type 7703 for PULSE, the Multi–analyzer System Type 3560, Bruel & Kjaer catalog, p. 1–7. (No date).
Gade et al., Order Tracking Using the Vold–Kalman Order Tracking Filter, Bruel & Kjaer, JSAE98, Vold Kalman 1–17. (No date).
Printout of Vold Solutions, Inc. Web Site, 11 pages. (No date).

* cited by examiner

*Primary Examiner*—Hal Wachsman
(74) *Attorney, Agent, or Firm*—Wood, Herron & Evans, L.L.P.

(57) ABSTRACT

A hand-held data collection and analyzing unit for collecting and analyzing vibration data induced by a rotating shaft including a processor that first converts the analog vibration signal into corresponding digital vibration samples. Thereafter, the processor provides in response to the digital vibration samples, corresponding output vibration samples in which samples within each set of output vibration samples are provided at a rate that varies as a function of variations in the speed of the rotating shaft. A digital processor then collects a time waveform record in response to a plurality of the output vibration samples, wherein the sample rate for the output vibration samples collected in the time waveform record varies as a function of variations in the speed of the rotating shaft.

20 Claims, 5 Drawing Sheets

ORDER TRACKING SIGNAL SAMPLING PROCESS

BACKGROUND OF THE INVENTION

This invention relates generally to the field of hand-held data collection and analyzer systems and more particularly, relates to an improved signal sampling process for such systems.

Hand-held data collection and analyzing systems are well known for collecting a variety of predictive maintenance data in numerous applications. Often, such collection and analyzer systems are used to collect data from rotating shafts representing vibrations created as a function of the shaft rotation. Such vibration data is analyzed to diagnose potential problems with components associated with the vibrating shaft. Such diagnostic information is used for predictive maintenance purposes and permits lesser problems to be detected and predicted prior to their maturing into more serious and more expensive problems to remedy.

One such hand-held data collector and analyzer system is described in U.S. Pat. No. 5,633,811, which, referring to FIG. 3 of the '811 patent, has an analog front end in which a vibration signal on line 19 is filtered and otherwise processed by analog components 40–50. The processed analog signal on line 22 is converted to a corresponding digital signal by an analog/digital converter 52. Thereafter, the digital signal is conditioned with digital filters 54, 56 prior to being analyzed by the data processor 28. The analog/digital converter 52 samples the input signal at 1 of 8 selectable sampling frequencies, the sampling frequency being chosen as a function of the speed of the rotating shaft (not shown) providing the vibration signal on line 19.

Figure 8:
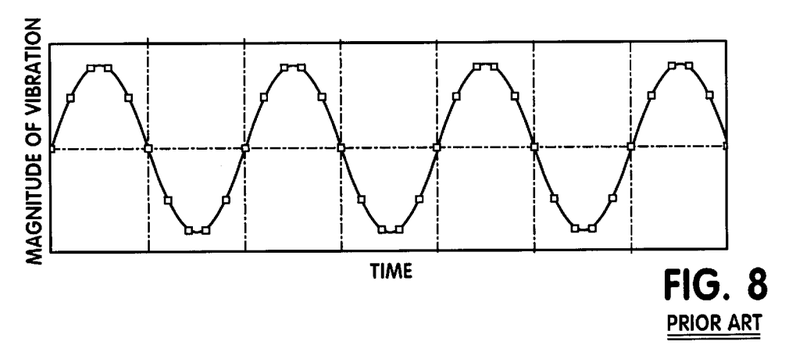
FIG. 8 is a time waveform diagram of a locus of output vibration samples from a shaft rotating at a constant speed.
Figure 9:
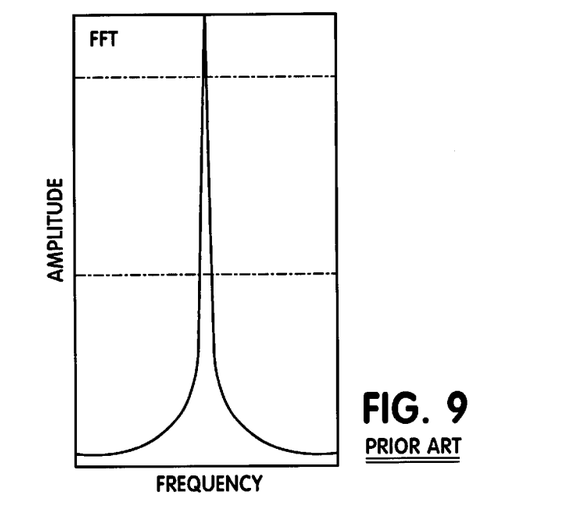
FIG. 9 is an illustration of a FFT record in which the frequency spectrum is concentrated in one bin.

Rotating bodies produce periodic vibrations and acoustic signals related to fundamental rotational speed and its harmonics which are integer multiples of the rotational speed. In the above system as well as other data collection systems, upon a frequency of interest being chosen by the user, a fast fourier transform (FFT) is performed on the digitized vibration signal. The FFT transforms the revolution domain data into a frequency spectrum. It is generally assumed that when the vibration data used in performing the FFT is being collected, the machine or shaft speed is constant. A shaft rotating at a constant speed will provide a locus of output vibration samples forming a constant frequency time waveform similar to that illustrated in FIG. 8. A vibration signal sampled therefrom has a fixed relationship to the rotational speed of the shaft, and provides an FFT display as illustrated in FIG. 9 in which the frequency spectrum is concentrated in one bin.

Figure 10:
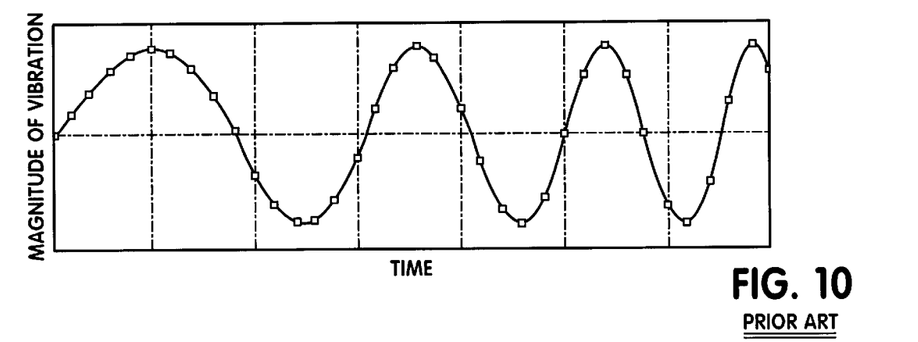
FIG. 10 is a time waveform diagram of a locus of output vibration samples from a shaft rotating at a variable speed and which are provided over equal increments of time as a function of the input sample rate.
Figure 11:
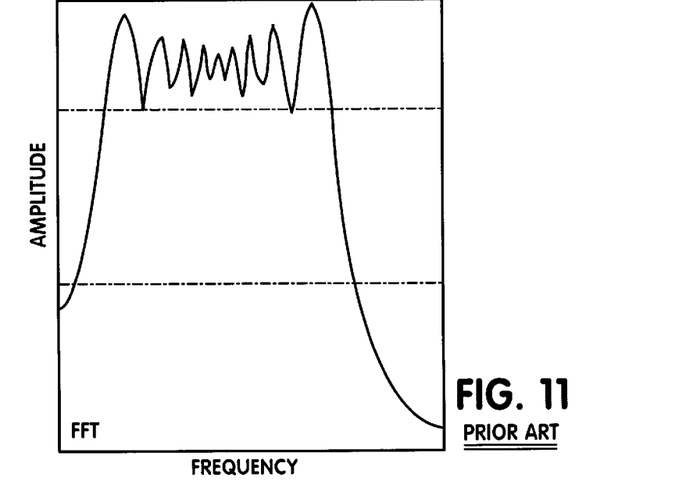
FIG. 11 is an illustration of a FFT record in which the frequency spectrum is spread over a frequency band corresponding to variations in speed of the rotating shaft.

Often, during normal operation, rotating shafts experience a change in speed. There are many reasons for such a change in speed, for example, a change in shaft load or, in a winding process, the material being wound is preferably moving at a constant linear speed. If the shaft speed changes, a time waveform is produced as illustrated in FIG. 10 in which a locus of output vibration samples are provided over equal increments of time as a function of the input sample rate. However, during the vibration signal sampling interval, the periodicity of the vibration signal from the rotating shaft shifts slightly in phase with respect to the fixed sampling, and thus, a different number of samples is provided for each different period of the input frequency spectrum. This causes the FFT record to smear, that is, as illustrated in FIG. 11, the frequency spectrum spreads over a frequency band corresponding to the speed change.

Such variations in shaft speed may be detected and compensated for in large laboratory equipment for performing vibration analysis. However, portable hand-held instrumentation is required to be as light, small and low powered as possible, and there are strict limitations on how such compensation can be implemented.

Therefore, there is a need to provide a portable hand-held instrument for collecting and analyzing vibration data that does not have the above-described disadvantage.

SUMMARY OF THE INVENTION

The present invention provides a simple, compact, inexpensive and reliable portable hand-held instrument for collecting vibration data that is independent of changes in speed of a rotating shaft inducing the vibration. The invention is especially useful in performing an order tracking frequency domain analysis, for example, a FFT analysis on collected vibration data induced by a shaft rotating at different speeds.

According to the principles of the present invention and in accordance with one embodiment, a hand-held data unit for collecting vibration data induced by a rotating shaft has a first input adapted to receive an analog vibration signal representing vibrations related to the rotating shaft and a second input adapted to receive a reference signal representing a current speed of the rotating shaft. A digital processor first converts the analog vibration signal into corresponding sets of digital vibration samples. Thereafter, the digital processor provides in response to the sets of the digital vibration samples, corresponding sets of output vibration samples in which samples within each set of output vibration samples are provided at a rate that varies as a function of variations in the speed of the rotating shaft. The digital processor then collects a time waveform record in response to a plurality of the output vibration samples, wherein the frequency of the output vibration samples in the plurality of output vibration samples collected in the time waveform record varies as a function of changes in the speed of the rotating shaft. Thus, the invention has the advantage of permitting a nonsmearing, high quality display of an order tracking frequency domain analysis, for example, a FFT analysis, using output vibration samples that are collected from a variable speed rotating shaft.

In one aspect of the system, the analog vibration signal is converted into sets of digital vibration signals over fixed intervals of time. Further, sets of output vibration samples are provided over the fixed intervals of time wherein the rate of the samples in each set varies as a function of variations in the speed of the rotating shaft.

In another aspect of the invention, the rotating shaft can be represented by a periodic mechanical system and output vibration samples are collected in a time waveform record in which the frequency of the output vibration samples varies as a function of variations in the frequency of the periodic mechanical system.

In another embodiment of the invention, a method of processing analyzing vibration data induced by a rotating shaft using a hand-held data collection and analyzing unit has a first step of collecting and converting input analog vibration signals into corresponding digital vibration samples over fixed intervals of time. Next the method provides in response to the digital vibration samples, corresponding sets of output vibration samples in which output vibration samples in each set having sample rates that vary as a function of variations in the current angular speed of the rotating shaft. Thereafter, the method collects a time waveform record in response to at least one of the sets of the output vibration samples wherein the frequency of the output vibration samples in the one set of output vibration samples varies as a function of variations in the speed of the rotating shaft.

These and other objects and advantages of the present invention will become more readily apparent during the following detailed description taken in conjunction with the drawings herein.

DETAILED DESCRIPTION OF THE INVENTION

Figure 1:
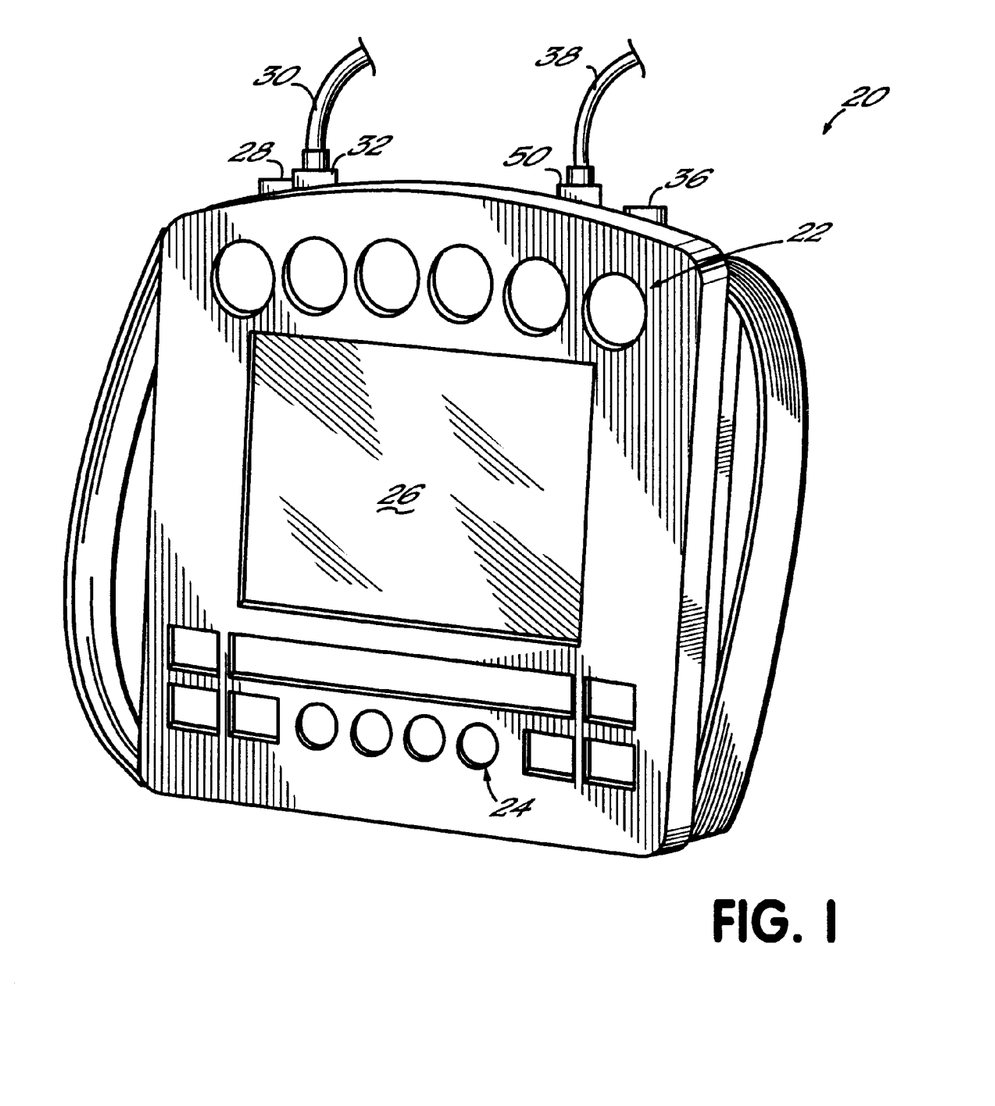
FIG. 1 is a front elevation view of a hand-held instrument for collecting and analyzing vibration data in accordance with the principles of the present invention.

Referring to FIG. 1, a hand-held vibration data collector and analyzer includes a user interface comprising upper keys 22, lower keys 24 and a VGA LCD display screen 26. The data collector 20 has a serial port input 28 that may be connected to one end of an RS-232 serial cable (not shown) having an opposite end connected to a personal computer. The data collector 20 has a second input 32 connectable via a cable 30 to a transducer mounted on a machine and providing the input data, for example, vibration data, to be analyzed. A third input 36 may be connected to a battery charger. A hand-held data collector similar to the data collector 20 of FIG. 1 is commercially available as model dataPAC 1500 from Entek IRD International Corp. of Milford, Ohio. Such data collectors are capable of measuring acceleration, velocity, displacement, spike energy, phase, temperature, thrust or axial position, AC and DC voltages, AdB and Vdb. Further, the data collectors often provide time-domain data collection, FFT analysis, RMS, peak-to-peak and DC measurements, as well as linear, exponential, RMS and peak-hold averaging. Such instruments generally have a frequency response of 0.18 Hz to 75.3 KHz.

Figure 2:
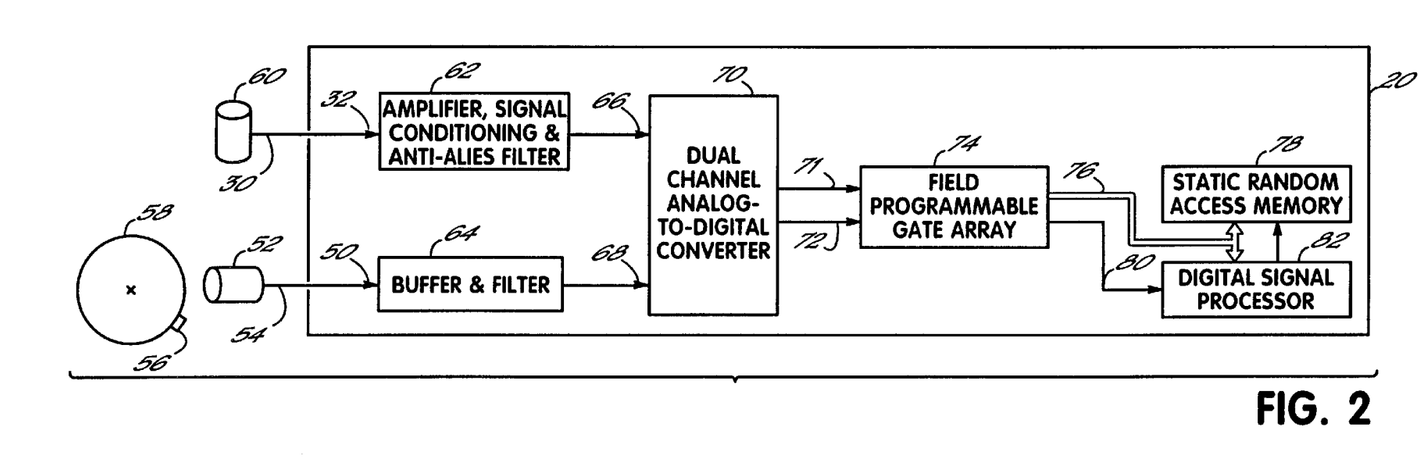
FIG. 2 is a schematic block diagram illustrating the basic components utilized in the hand-held instrument for collecting and analyzing vibration data in accordance with the principles of the present invention.

In performing an FFT analysis, the hand-held data collector and analyzer 20 of FIG. 1 functions best if the vibration being measured is induced by an input, for example, a rotating shaft, operating at a constant speed. Variations in the input frequency spectrum during the sampling process will provide a smearing, that is, a less accurate and less precise FFT analysis as illustrated in FIG. 11. To improve the FFT analysis for a vibration signal induced by a variable speed input, the data collector 20 provides vibration samples to the FFT analyzer, not over equal increments of time, but instead over equal increments of angular displacement of the rotating shaft. As shown in FIG. 2, the data collector 20 includes a further input 50 via a cable 38 to a transducer 52 which provides an output signal on line 54 having a frequency proportional to the speed of the input. For example, the transducer 52 may be a proximity sensor such as a magnetic or photoelectric sensor which is mounted adjacent to a key 56 on a rotating shaft 58. Thus, with every rotation of the shaft 58, as the key 56 passes the transducer 52, the state of a transducer output reference signal changes. Those changes of state over time represent the angular rate of rotation of the rotating shaft 58, that is, the shaft speed.

A second transducer 60 which is applied to the machine in a known manner, for example, placed in mechanical contact with a machine element, such as a bearing race, produces an analog signal representing mechanical vibrations experienced by the machine element to which the transducer 60 is attached. Normally, those vibrations are induced by the rotation of the shaft 58. The signal conditioning of the analog vibration input signal is well known and generally includes signal amplification and anti-alias filtering by an amplifier and filter circuit 62. The reference signal on input 50 is buffered and filtered in circuit 64. Further, the exact implementation of the circuits 62, 64 will depend on the type of transducers 60, 52 being used to provide the respective vibration and reference signals. The conditioned vibration and reference signals from circuits 62, 64 are provided to inputs 66 and 68, respectively, of a dual channel analog-to-digital ("A/D") converter 70 which simultaneously samples the signals on the inputs 66, 68, for example, at a rate of 153.6 KHz. With each sample, the A/D converter 70 provides 18 bit words on output paths 71, 72 that represent digital representations of the analog vibration and reference signals on the respective inputs 60, 68. A field programmable gate array 74 forms two 32 bit words from the two 18 bit inputs and transfers the 32 bit words via a direct memory access process to a static random access memory ("SRAM") 78. With each 2,048 samples processed by the field programmable gate array 74, an interrupt is provided over line 80 to a digital signal processor ("DSP") 82. With each interrupt, the DSP processes the 1,024 samples of the vibration signal and 1,024 samples of the reference signal which have been stored in the SRAM 78. Further, the DSP 82 must complete its processing of the group of 2,048 vibration and reference samples prior to receiving the next interrupt from the field programmable gate array 74, that is, the time required for the A/D converter 70, running at 153.6 kHz, to collect 1024 samples or approximately 6.7 milliseconds. It should be noted that the number of samples processed in each set, for example, 2048, is programmable and a matter of design choice.

Figure 3:
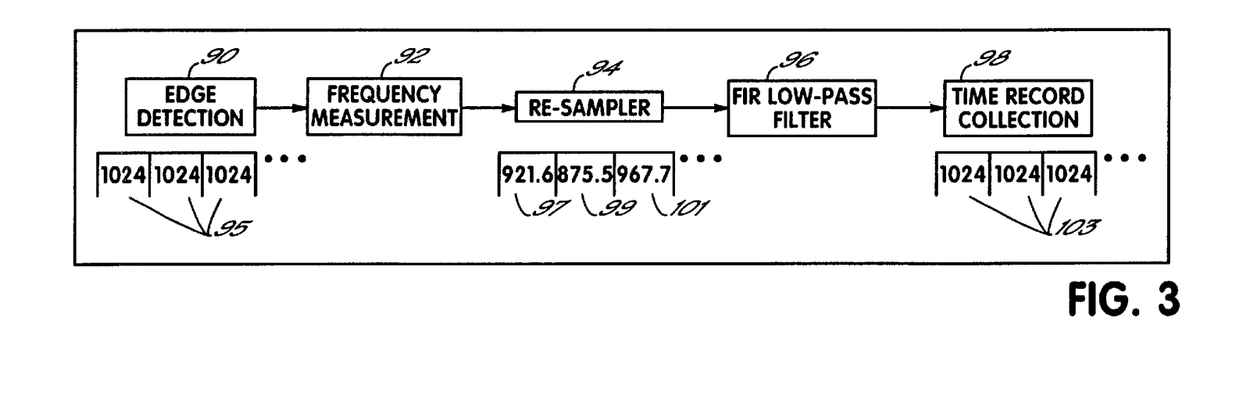
FIG. 3 is a block diagram illustrating the functions performed by a digital signal processor illustrated in FIG. 2 in collecting and analyzing data in accordance with the principles of the present invention.

Referring to FIG. 3, in processing the input signals, the DSP 82 first executes an edge detection subroutine 90. In this process, the DSP sequentially reads each of the 1,024 reference samples. Each sample is tested to determine whether it is representative of a change of state of the signal produced by the transducer 52. Normally, the transducer 52 will produce a spike, a pulse or other analog signal in response to detecting an edge. Further, many of the characteristics of the reference sample to be detected are user selectable. The user may select a desired slope of the reference sample, for example, whether to detect a leading edge or a trailing edge. Further, the user may select whether to detect a rising or falling slope, or a positive or negative slope. In addition, the user may select a threshold characteristic, for example, a threshold amplitude at which the reference sample can be considered an edge. A hysteresis characteristic, that is, a bandwidth around the threshold amplitude within which the selected threshold is deemed valid, is normally established by the DSP 82.

Given the above slope, threshold and hysteresis characteristics, the DSP 82 analyzes each of the stored 1,024 reference samples looking for an edge. If a sample is found which results in an edge being detected, the identity of that reference sample within the group of 1,024 reference samples is stored as representing the time of an edge. Therefore, after all of the reference samples have been analyzed, the identity of specific reference samples, if any, each representing the time of a detected edge is stored. Knowing the identity or location of a specific reference sample representing an edge within the group of 1,024 reference samples facilitates the subsequent determination of the reference frequency and hence, the speed of the shaft. If the speed of the rotating shaft 58 is slower, for example, less than 150 Hz, the DSP 82 will not detect an edge in every group of 1,024 reference samples. Alternatively, if the speed of the rotating shaft 58 is higher, for example, greater than 150 Hz, the DSP 82 may detect more than one edge within a group of 1,024 reference samples.

After processing all of the 1,024 reference samples, the DSP 82 then executes a frequency measurement subroutine 92 in which frequency of the reference signal, that is, the speed of the rotating shaft 58 is determined. At the end of the edge detection subroutine 90, the DSP 82 has data identifying the reference sample of the most recently detected edge and the reference sample of the immediately preceding edge. Therefore, the DSP 82 can easily determine the number of samples between those two edges. Further, since the samples are generated on a fixed time basis, the DSP 82 can determine the time period between the detected edges. The inverse of that time period is a frequency which is proportional to the frequency of the reference signal and the instantaneous speed of the rotating shaft 58.

It is a preferred practice to use an average of the speed of the shaft over time as opposed to a determination of the instantaneous speed. The determination of the instantaneous speed is subject to nonrepeatable errors in the detection and sampling process as well as noise. However, simply averaging the determined frequency over time provides poor results where the shaft speed is changing as a function of time. Therefore, in a known manner, the frequency measurement process utilizes a least-sum-squares curve fitting algorithm to provide an estimate of the current machine speed. In performing the averaging process, the frequency measurement process 92 uses the lesser of either, the last 128 determinations of the reference signal frequency, that is, the last 128 speed measurements, or, the number of reference frequency measurements made during the last second.

Upon determining the current average input frequency of the reference signal which is directly related to the speed of the rotating shaft 58, the DSP 82 then executes a resampling routine 94. The purpose of the resampling process 94 is to be able to respond to a shaft rotating at a variable speed and having a time waveform as illustrated in FIG. 10 and, provide vibration samples for an order tracking frequency domain analysis that produces, for example, an FFT record as illustrated in FIG. 9. To accomplish this, the resampling process receives vibration samples at a fixed rate and provides output vibration samples at a rate that varies as a function of the rate of rotation of the shaft 58. In other words, the resampling process 94 provides vibration samples for an order tracking frequency domain analysis over equal increments of angular displacement of the shaft 58. Therefore, for every revolution of the shaft 58, the same number of vibration signal samples will be provided by the resampling process 94 for the order tracking frequency domain analysis independent of the speed of the shaft 58.

During a sampling period of approximately 6.7 milliseconds ("ms"), 1024 vibration samples are collected, that is, a sample is collected approximately every 6.5 microseconds ("$\mu s$"). The resampling process 94 reads the input samples from the SRAM 78, and provides output vibration samples as a function of the speed of the shaft 58. As will be appreciated, the processing time of the input samples is directly proportional to the number of samples being processed. Therefore, as a matter of design choice, to reduce the processing time, for a set of 1024 samples, the resampling process 94 of FIG. 3 is designed to provide a fewer number of output samples, for example, 90% of the input samples. Thus, under a constant speed condition, resampling process 94 provides an average of 921.6 output vibration samples for each set of 1,024 vibration samples collected. Further, the average of 921.6 samples are equally spaced over the approximately 6.7 ms sampling period, and thus, are provided approximately every 7.2 $\mu s$, that is, at approximately 138.24 KHZ.

Figure 4:
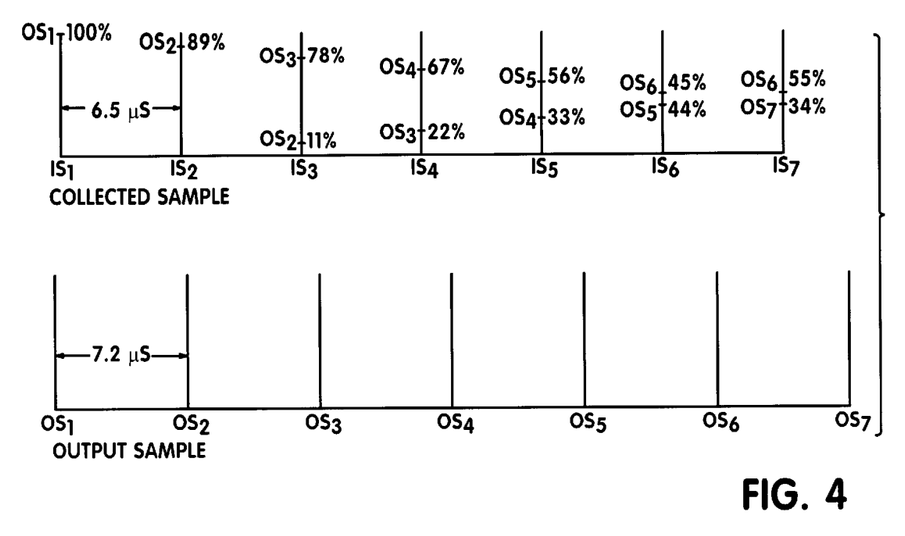
FIG. 4 is a schematic diagram illustrating how output vibration samples are produced by linear interpolation of the collected vibration samples with a constant speed shaft.
Figure 5:
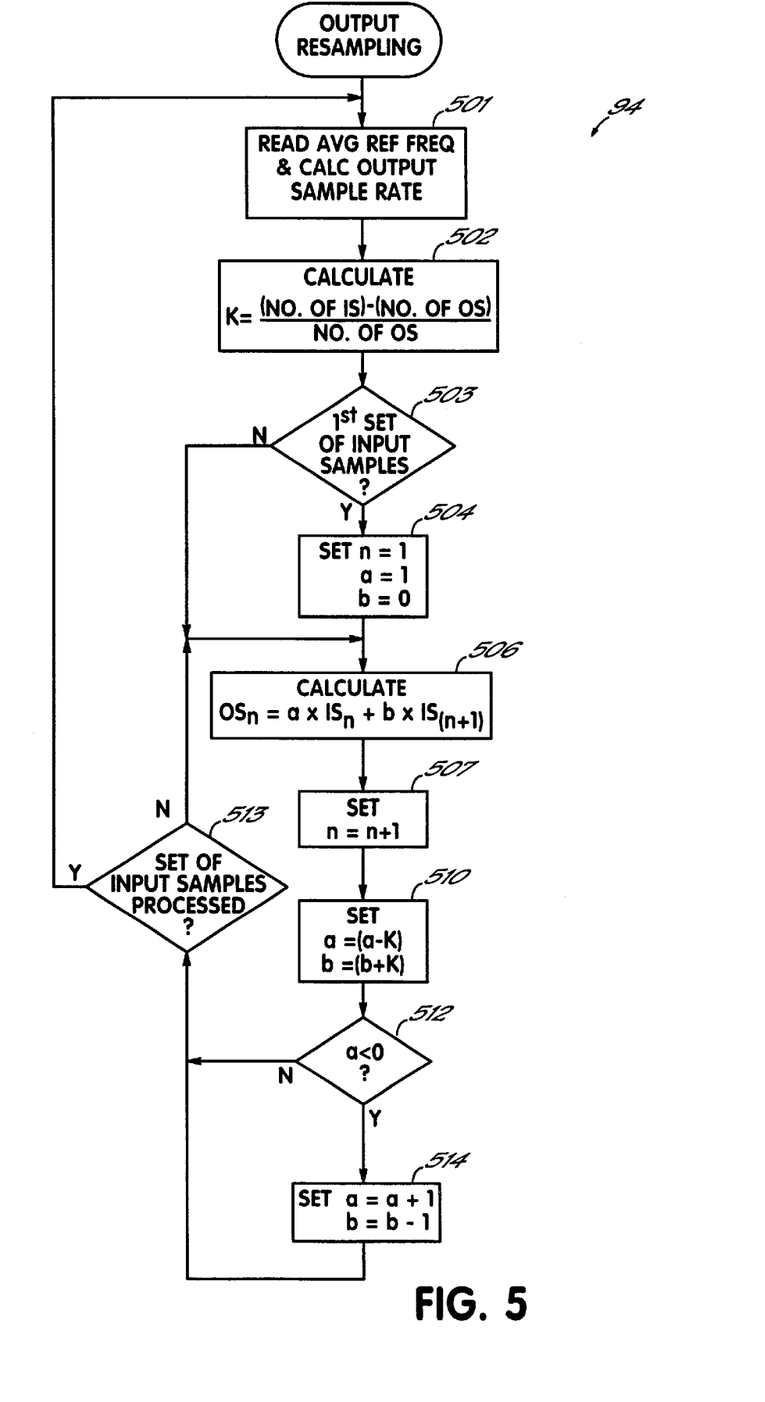
FIG. 5 is a flow chart of a resampling process in accordance with the principles of the present invention.

The resampling process 94 of FIG. 3 by which output sample values are determined is further illustrated in the flow chart of FIG. 5. The first step 501 is to read the most recently calculated average reference frequency and determine an output sample frequency or rate. For a constant speed situation, the number of output samples remains constant at 921.6; however, if the average measured reference frequency decreases or increases, as will subsequently be described, the number of output samples will be proportionally reduced or increased, respectively. Next at 502, the process calculates an interpolation constant k as a function of the number of input sample ("IS") and the number of output samples ("OS"). Given the present example of 1024 output samples and 921.6 output samples, k is determined to be approximately equal to 0.11. Then at 503, the resampling process 94 detects whether the first set of 1024 input vibration samples is being processed; and if so, at 504, the sample number, n, is set equal to 1 and multipliers a and b are set to one and zero, respectively. Thereafter, at 506, the value of the first output sample $OS_1$ is determined (equal to the magnitude or value of the first input vibration sample $IS_1$); and at 507, the sample number is incremented by 1. The process then at 510 establishes new values for the multipliers a and b as a function of the value of the interpolation constant k. Where 1024 samples are being converted to 921.6 samples, for the second sample, multiplier a is equal to 0.89 and b is equal to 0.11. At 512 the resampling process checks whether the multiplier a is less than zero. If not, the process then at 513 determines whether a full set of 1024 input samples has been processed. If not, the process returns to 506, and the second output sample $OS_2$ is determined to be equal to 89% of the second input sample $IS_2$ plus 11% of the magnitude of the third input sample $IS_3$ (FIG. 4) as determined by a process of linear interpolation. The process of FIG. 5 then moves through steps 507 through 512 reestablishing new values for multipliers a and b (of 0.78 and 0.22, respectively when 1024 samples are being converted to 921.6 samples); and the process at 506 determines the value for the third output vibration sample $OS_3$ that is equal to 78% of the value of the third collective sample in $IS_3$ and 22% of the value of the fourth collective sample $IS_4$. In a similar manner, the value of the fourth output sample $OS_4$ is equal to 67% of the magnitude of the fourth collected sample $IS_4$ plus 33% of the magnitude of the fifth collected sample $IS_5$. The values of the other output vibration samples $OS_5$, $OS_6$, etc. are similarly determined by using the linear interpolation process to increment through the values of the collected vibration samples $IS_5$, $IS_6$, $IS_7$, etc.

When the resampling process at 513 detects the end of the processing of the first set of 1024 input samples, the process then returns to 501 and reads the current value of the average frequency and then at 502 recomputes the interpolation constant k. In a constant speed situation, the output sample rate and the interpolation constant k will remain constant. After recomputing constant k at 502, the process at 503 detects that the current set of 1024 vibration samples is not the first set and skips step 504. The resampling process 94 then iterates through steps 506–513 as described above for each subsequent set of 1024 input vibration signals until all of the time records have been collected as determined by the processor 82.

In general, the output vibration samples produced by resampling process 94 are further processed prior to the waveform collection via an antialiasing lowpass finite impulse response ("FIR") filter 96 of FIG. 3. For a constant speed input, the above resampling process provides a time waveform of a locus of output vibration samples as illustrated in FIG. 8 and a FFT analysis as illustrated in FIG. 9.

During the approximately 6.7 ms sample period, each of the 1024 collected vibration samples are used to determine the values for an average of 921.6 output vibration samples. However, as will be appreciated, during the processing of one group of 1024 input samples, an integer number of output vibration samples must be produced. In the example described above, during the first processing interval, 921 output vibration samples is produced. After the first group of 1024 input samples is processed, the resampling process carries remainder values used in determining the value of the first output sample in the next set of output samples that are to be provided from the next group of 1024 input samples. As a result, under constant speed conditions, during the next processing interval, 922 output vibration samples will be produced in response to the 1024 input samples; and a remainder values will be carried over to be used in determining the value of the first output sample from the third set of 1024 input samples. That same process continues such that, even though during any processing interval, an integer number of output vibration samples is produced, for a constant speed condition, over time, an average of 921.6 samples is provided during the processing of each set of 1024 input samples.

Instead of a constant speed rotation as described above, the speed or angular rate of rotation of the shaft 58 may be changing. Assume, for example, that the frequency measurement process 92 determines at step 501 that the speed of the shaft 58, has slowed down by approximately 5% from its initial speed as shown by the waveform in FIG. 8. Therefore, the resampling process 94 must at 501 decrease the sample rate of the output vibration samples by a factor proportional to the decrease in the shaft speed. The new output sample rate can be determined as follows:

$$NewOutputSamplePeriod = \frac{Original\ Freq.}{New\ Freq.} \times OldOutputSamplePeriod$$

In the above described example, the old output sample period is 7.2 μs; and therefore, if the shaft speed slows 5%, the output sample frequency is reduced by 5%; and the old output sample period will be increased by a factor of 5% to provide a new output sample period of approximately 7.6 μs. Since the output sample rate is less, fewer output samples, for example, approximately 875.5 samples, will be provided during the approximately 6.7 ms sample period, and preferably, the 1024 collected samples will be used to provide those 875.5 samples.

Referring to FIG. 5, to produce 875.5 output samples from 1024 input samples, the process at 502 calculates a new value for the interpolation constant K, which is a function of the number of input samples and the desired number of output samples, that is, 1024 and 875.5, respectively. For that example, the value of K is equal to approximately 0.17. At 506, the first output sample $OS_1$ is most often determined from the magnitude or value of the last sample from the last group of samples and the value of first input samples of the new group of 1024 input samples. The process then at 507 increments the sample number and at 510, adjusts the values of a and b using the new constant k. Returning to process step 506, the value of the second output vibration sample $OS_2$ is computed from the magnitude of the first collected input vibration sample $IS_2$ and the magnitude of the second collected input vibration sample $OS_3$.

Figure 6:
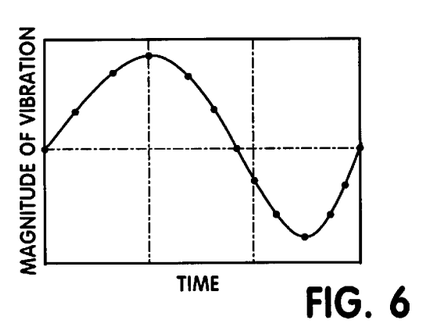
FIG. 6 is a time waveform diagram of a locus of output vibration samples from a shaft rotating at one speed and resampled as a function of shaft speed in accordance with the principles of the present invention.

Similarly, the resampling process 94 provides a value for the third output vibration sample $OS_3$ from the value of the second collected sample $IS_3$ and the value of the third collected sample $IS_4$. The values of the other output vibration samples $OS_5$, $OS_6$, etc. are similarly determined by using a linear interpolation process to increment through the values of the collected vibration samples $IS_6$–$IS_7$, etc. Thus, substantially all of the 1024 collected vibration samples will be used to provide the approximate 875.5 output vibration samples. For a slowing shaft speed, the resampling process provides a locus of output vibration signals as shown in FIG. 6. The output samples are provided at a rate different from the input sample rate, but the samples are provided over equal increments of shaft rotation and provide the FFT analysis illustrated in FIG. 9.

Figure 7:
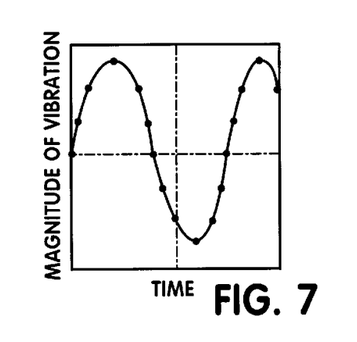
FIG. 7 is a time waveform diagram of a locus of output vibration samples from a shaft rotating at a faster speed and resampled as a function of shaft speed in accordance with the principles of the present invention.

In a similar manner, if after processing a set of 1024 input samples, the process at 501 detects that the shaft speed, and hence, the average reference frequency has increased by, for example, 5%, the process at 501 will decrease the period of the output sample rate by a factor of 1.05 to provide a new output sample period of approximately 6.9 μs. Since the output sample rate is greater, more output samples, for example, approximately 967.7 samples, will be provided during the approximately 6.7 ms sample period, and preferably, the 1024 collected samples will be used to provide those 967.7 samples. In determining each of the new output sample values, the process at 502 of FIG. 5 will calculate a new interpolation factor K=0.06. In a manner similar to that previously described with respect to FIG. 5, the values of new output vibration samples are provided by the resampling process 94. With an increase in the shaft speed, the resampling process 94 provides a locus of output vibration signals as shown in FIG. 7, that is, over equal increments of shaft rotation, and provide the FFT analysis illustrated in FIG. 9.

Referring to FIG. 3, the resampling process 94 provides resampled output vibration samples to an antialiasing lowpass FIR process 96 which is implemented within the processor 82 and functions to decimate the vibration samples from the resampler 94 to a number of samples appropriate for the time record collection process 98. The operation of the FIR filter is generally known and will not be described in detail; however the present invention provides improvement to the known FIR filter operation. With the present invention, a FIR filter process uses the initial rate of output vibration samples to select a plurality of filter coefficients in the construction of a FIR filter; and those same filter coefficients are used throughout the time record collection process. However, it is a known characteristic of a lowpass FIR filter that the corner frequency has a value that tracks the rate of the output vibration samples. Thus, if the frequency of the output vibration samples increases by 5%, the corner frequency of the lowpass FIR filter will also increase by 5%. Thus, the corner or cutoff frequency of the FIR filter changes with, and tracks, the machine speed; and the filter is a tracking antialiasing lowpass FIR filter. Thereafter, the processor 82 implements a time waveform collection process at 98 which collects and organizes the resampled and filtered output vibration samples into time waveform records of $2^n$ samples for each time waveform record. An order tracking frequency domain analysis, for example, an FFT analysis, is then often performed. The number of time waveform records used in each analysis is user selectable, and the process described in FIGS. 3 and 5 continues to iterate in real time until the processor 82 determines that the number of time waveform records collected corresponds to that selected by the user. In general, the time waveform record collection process 98 is known and, therefore, will not be described in further detail.

To summarize, referring to FIGS. 2 and 3, the data collector 20 of the present invention provides a real time process of time waveform record collection in which the frequency of output vibration samples within the time waveform record collection vary as a function of shaft speed. The input analog vibration signal and an input reference signal are sampled by the A/D converter 66 at 153.6 kHz, that is, over approximately 6.7 ms sampling intervals. Digital samples of each of the input signals are stored in the SRAM 78. After sets of 1024 samples of each of the vibration and reference signals have been stored, the FPGA 74 interrupts processor 82. The processor 82 scans the 1024 reference samples; and at 90, the processor 82 identifies any reference pulses that represent an edge transition from the transducer 52. Next, the processor 82 executes the measurement process 92 to determine an average reference frequency representing the shaft speed. Thereafter, the processor 82 executes a resampling process 94 which, for each group of 1024 samples (95 of FIG. 3), creates a new group of samples as a function of the shaft speed, that is, the average reference frequency, for example, 921.6 samples (at 97), 875.5 samples (at 99), 967.7 samples (at 101), etc. After filtering the output vibration samples with an antialiasing, lowpass filter process 96, the processor 82 then executes the time record collection process 98 which organizes the resampled and filtered output vibration samples into time records with $2^n$ samples, for example, 1024 samples, 103. In addition, the process 98 performs an order tracking frequency domain analysis, for example, a FFT analysis. The frequency of the resampled and filtered output vibration samples in each of the time waveform records varies as a function of the average frequency of the reference signal representing the shaft speed. Therefore, the rate and periodicity of the collected output samples being subject to an analysis is dynamically changing during the record collection process as a function of the speed of the shaft 58. The net result is that the data collector 20 provides an analysis, for example, an FFT display on screen 26 (FIG. 1) as illustrated in FIG. 9 for a rotating shaft that varies in speed. Thus, signals that are periodic in the angular resolution domain appear as peaks in the order spectrum independent of the speed of the rotating shaft.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, the invention has been described with respect to vibrations derived from a rotating shaft; however, as will be appreciated the invention is applicable to the analysis of vibration signals produced from any other periodic mechanical system.

In addition, the transducer 52 may be used to detect other edges with respect to the rotating shaft 58, for example, the edges of gear teeth, keyways, etc. Alternatively, the transducer 52 may be an encoder mechanically coupled to the rotating shaft 58 so that it produces pulses on output line 54 as a function of the rotation of shaft 58. In addition, while a least sum squares algorithm is used to provide an average speed value, other known averaging algorithms may be used.

The above embodiment of the invention describes the collection of sets of 1024 input samples from the A/D converter 70 for processing; however, as will be appreciated, the input samples may be collected from the A/D converter 70 and processed in sets having fewer samples or one sample at a time. The choice of how the input samples are collected is a design decision that is principally determined by the digital processing unit. The processing of an interrupt consumes significant time, and therefore, normally the number of interrupts is minimized. However, with faster processors, additional interrupt processing may be considered acceptable. Further, the described embodiment utilizes a first order estimator, for example, a process of linear interpolation, to produce the values for the output vibration samples as a function of the values of the input vibration samples. As will be appreciated, other estimators may be used. For example, a zero order estimator may be used which selects an output sample value that is equal to the value of the nearest input sample. Alternatively, higher order estimators, for example, estimators using second or higher order polynomials may also be used. The use of a particular estimator is a matter of design choice. As will be appreciated, the numerical values recited in the above description have, for convenience, been rounded off and therefore, are only approximations of the numerical values being used by the processor 82.

Therefore, the invention in its broadest aspects is not limited to the specific details shown and described. Consequently, departures may be made from the details described herein without departing from the spirit and scope of the claims which follow.

What is claimed is:

1. A hand-held data collection and analyzing unit for collecting and analyzing vibration data induced by a rotating shaft, the unit comprising:
   a first input adapted to receive an analog vibration signal representing vibrations related to the rotating shaft;
   a second input adapted to receive a reference signal representing a speed of the rotating shaft; and
   a digital processor configured to:
      convert the analog vibration signal into corresponding sets of digital vibration samples over fixed intervals of time;

provide in response to the corresponding sets of digital vibration samples corresponding sets of output vibration samples over a selected one of the fixed intervals of time at a sample rate that varies as a function of variations in the speed of the rotating shaft during the selected fixed interval of time, and in response to a constant speed of the rotating shaft, an initial number of samples in each set of output vibrations samples less than the number of samples in a corresponding set of digital vibration samples; and collect a time waveform record in response to a plurality of the output vibration samples, the plurality of output vibration samples collected in the time waveform record having an output sample rate varying as a function of variations in the speed of the rotating shaft.

2. The unit of claim 1 wherein the digital processor is further configured to perform an order tracking frequency domain analysis in response to the time waveform record.

3. The unit of claim 1 wherein the digital processor is further configured to perform a Fast Fourier Transform (FFT) analysis in response to the time waveform record.

4. The unit of claim 1 wherein the digital processor is further configured to collect a time waveform record in response to at least two sets of output vibration samples, each of the two sets of output vibration signals having an output vibration sample rate varying as a function of variations in the speed of the rotating shaft.

5. The unit of claim 1 wherein the digital processor is configured to provide over the selected fixed interval of time a greater number of samples in each set of output vibration samples in response to an increase in the speed of the rotating shaft.

6. The unit of claim 1 wherein the digital processor is further configured to provide over the selected fixed interval of time values for samples in each set of output vibration samples in response to all of the samples in a corresponding set of digital vibration samples.

7. The unit of claim 1 wherein the digital processor is further configured to provide values for samples in each set of output vibration samples by interpolating through all of the samples in a corresponding set of digital vibration samples.

8. The unit of claim 7 wherein the digital processor is further configured to provide values for samples in each set of output vibration samples by linearly interpolating through all of the samples in the corresponding set of digital vibration samples.

9. The unit of claim 1 wherein the digital processor is further configured to provide over the selected fixed interval of time and in response to a changing speed of the rotating shaft, a different number of samples in each set of output vibration samples proportional to the change in speed of the rotating shaft.

10. The unit of claim 9 wherein the digital processor is further configured to provide over the selected fixed interval of time and in response to the changing speed of the rotating shaft, values for each of the samples in each set of output vibration samples equal to linearly interpolated values of samples in a corresponding set of digital vibration samples.

11. The unit of claim 10 wherein the digital processor is further configured to provide new values for each of the samples in a set of output vibration samples by incrementing by a constant factor through the values of the samples in the corresponding set of digital vibration samples.

12. The unit of claim 1, wherein the speed of the rotating shaft is a current speed.

13. The unit of claim 12 wherein the digital processor is further configured to collect a time waveform record in response to a plurality of sets of output vibration samples, each of the plurality of sets of output vibration samples in the time waveform record having a sample rate varying as a function of variations in the speed of the rotating shaft.

14. The unit of claim 13 wherein the digital processor is further configured to perform an order tracking frequency domain analysis in response to the time waveform record.

15. The unit of claim 14 wherein the digital processor is further configured to perform a Fast Fourier Transform (FFT) analysis in response to the time waveform record.

16. A hand-held data collection and analyzing system for collecting and analyzing vibration data produced by a rotating shaft, the system comprising:

a first transducer adapted to provide an analog vibration signal as a function of vibrations related to the rotating shaft;

a second transducer adapted to provide an analog reference signal representing a current speed of the rotating shaft;

analog signal conditioning circuits having inputs electrically coupled to the first and second transducers and configured to amplify and filter the analog vibration and analog reference signals;

an analog to digital converter electrically coupled to the analog signal conditioning circuits and configured to provide sets of digital vibration samples and digital reference signals over fixed intervals of time as a function of the respective analog vibration and analog reference signals; and a digital processor in electrical communication with the analog to digital converter, the digital processor configured to:

provide in response to the sets of the digital vibration samples, corresponding sets of output vibration samples over a selected one of the fixed intervals of time, each set of output vibration samples being determined as a function of the current speed of the rotating shaft, and in response to a constant speed of the rotating shaft, an initial number of samples in each set of output vibration samples less than the number of samples in a corresponding set of digital vibration samples, and perform an order tracking frequency domain analysis in response to at least two of the sets of output vibration samples.

17. A hand-held data collection and analyzing unit for collecting and analyzing vibration data induced by a periodic mechanical system, the unit comprising:

a first input adapted to receive an analog vibration signal representing vibrations related to the periodic mechanical system;

a second input adapted to receive a reference signal representing a frequency of the periodic mechanical system; and a digital processor configured to:

convert the analog vibration signal into corresponding sets of digital vibration samples over fixed intervals of time, provide in response to the sets of digital vibration samples, corresponding sets of output vibration samples over a selected one of the fixed intervals of time at an output sample rate that varies as a function of variations in the frequency of the periodic mechanical system during the selected fixed interval of time, and in response to a constant frequency of the periodic mechanical system, an initial number of samples in each set of output vibration samples less than the number of samples in a corresponding set of digital vibration samples, and collect a time waveform record in response to at least two sets of the output vibration samples, the frequency of the output vibration samples in the at least two sets of output vibration samples collected in the time waveform record varying as a function of the frequency of the periodic mechanical system.

18. The unit of claim 17 wherein the digital processor is further configured to provide sets of output vibration samples over the fixed intervals of time as a function of the current frequency of the periodic mechanical system.

19. A method of processing analyzing vibration data induced by a rotating shaft using a hand-held data collection and analyzing unit, the unit having a first input receiving an analog vibration signal representing vibrations related to the rotating shaft and a second input receiving a reference signal representing a current speed of the rotating shaft, the method comprising the steps of:

converting the analog vibration signal into corresponding sets of digital vibration samples over fixed intervals of time;

providing in response to the digital vibration samples, corresponding sets of output vibration samples over a selected one of the fixed intervals of time at a sample rate that varies as a function of variations in the current speed of the rotating shaft during the selected fixed interval of time;

providing in response to a constant speed of the rotating shaft, an initial number of samples in each set of output vibrations samples less than the number of samples in a corresponding set of digital vibration samples; and collecting a time waveform record in response to a plurality of the output vibration samples, a frequency of the output vibration samples in the plurality of output vibration samples collected in the time waveform record varying as a function of the current speed of the rotating shaft.

20. A method of processing analyzing vibration data induced by a periodic mechanical system using a hand-held data collection and analyzing unit, the unit having a first input receiving an analog vibration signal representing vibrations related to the periodic mechanical system and a second input receiving a reference signal representing a current frequency of the periodic mechanical system, the method comprising the steps of:

converting the analog vibration signal into corresponding sets of digital vibration samples over fixed intervals of time;

providing in response to the sets of digital vibration samples, corresponding sets of output vibration samples over a selected one of the fixed intervals of time that vary as a function of variations in the current frequency of the periodic mechanical system during the selected fixed interval of time;

providing in response to a constant frequency of the periodic mechanical system, an initial number of samples in each set of output vibrations samples less than the number of samples in a corresponding set of digital vibration samples; and collecting a time waveform record in response to a plurality of the output vibration samples, the frequency of the output vibration samples in the plurality of output vibration samples collected in the time waveform record varying as a function of a frequency of the periodic mechanical system.

* * * * *